United States Patent
Lahti et al.

(10) Patent No.: US 7,275,426 B2
(45) Date of Patent: Oct. 2, 2007

(54) INTERNAL COMBUSTION ENGINE CONTROL SYSTEM

(75) Inventors: John L. Lahti, Marquette, MI (US); John J. Moskwa, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/278,207

(22) Filed: Mar. 31, 2006

(65) Prior Publication Data

US 2007/0088487 A1    Apr. 19, 2007

Related U.S. Application Data

(60) Provisional application No. 60/667,384, filed on Apr. 1, 2005.

(51) Int. Cl.
*G01M 15/00* (2006.01)
(52) U.S. Cl. .................................... 73/118.1
(58) Field of Classification Search ............. 73/116, 73/117.2, 117.3, 118.1, 118.2
See application file for complete search history.

(56) References Cited

U.S. PATENT DOCUMENTS

| | | | |
|---|---|---|---|
| 5,094,213 A | 3/1992 | Dudek et al. | |
| 5,159,914 A | 11/1992 | Follmer et al. | |
| 5,357,932 A | 10/1994 | Clinton et al. | |
| 5,394,331 A | 2/1995 | Dudek et al. | |
| 5,421,302 A | 6/1995 | Livshits et al. | |
| 5,463,993 A | 11/1995 | Livshits et al. | |
| 5,479,897 A | 1/1996 | Kawai et al. | |
| 5,609,136 A | 3/1997 | Tuken | |
| 5,714,683 A | 2/1998 | Maloney | |
| 5,901,682 A | 5/1999 | McGee et al. | |
| 5,974,870 A | 11/1999 | Treinies et al. | |
| 6,155,242 A | 12/2000 | Kotwicki et al. | |
| 6,640,622 B2 * | 11/2003 | Soliman et al. | ............ 73/118.2 |
| 6,655,201 B2 | 12/2003 | Masson et al. | |
| 6,708,102 B2 * | 3/2004 | Jankovic et al. | ............ 701/102 |
| 6,856,891 B2 * | 2/2005 | Yasui | ......................... 701/109 |
| 2003/0005756 A1 * | 1/2003 | Soliman et al. | ............... 73/116 |
| 2004/0024517 A1 * | 2/2004 | Jankovic et al. | ............ 701/102 |
| 2006/0276953 A1 * | 12/2006 | Davis et al. | ................ 701/102 |

OTHER PUBLICATIONS

Kotwicki et al., 1999, An Air Meter Based Cylinder Air Charge Estimator, SAE International, International Congress and Exposition, Detroit, Michigan.
Schelske et al., 2004, Ricardo Controls & Electronics Advanced Algorithm Development.

* cited by examiner

*Primary Examiner*—Eric S. McCall
(74) *Attorney, Agent, or Firm*—Craig A. Fieschko, Esq.; DeWitt Ross & Stevens S.C.

(57) ABSTRACT

A control system for an internal combustion engine includes a virtual engine model which mathematically represents the states of the engine in real time, but which is programmed to provide the engine's states at least a fraction of an engine cycle (and preferably at least one-fourth of an engine cycle, i.e., one stroke) to several engine cycles in advance of the real engine. The mass flow entering and leaving the cylinder is modeled, allowing parameters such as the mass of air per cylinder (MAC) and residual exhaust gas to be computed, and thereafter used to generate engine control commands related to fuel injection (air/fuel ratio), spark advance, and so forth.

24 Claims, 1 Drawing Sheet

INTERNAL COMBUSTION ENGINE CONTROL SYSTEM

CROSS-REFERENCE TO RELATED APPLICATIONS

This application claims priority under 35 USC §119(e) to U.S. Provisional Patent Application No. 60/667,384 filed 1 Apr. 2005, the entirety of which is incorporated by reference herein.

FIELD OF THE INVENTION

This document concerns an invention relating generally to engine control systems, and more specifically to engine control systems which adjust fuel injection, spark timing, and/or residual exhaust gas to attain desired performance, fuel economy, and emissions.

BACKGROUND OF THE INVENTION

Older internal combustion engines, having valve opening and closing occurring at the same times during the engine cycle in dependence on engine-driven cams, had the drawback that the fixed valve opening and closing times (as well as the valve lift profiles, i.e., the degree of lift over time) were optimized for a certain speed range. At this speed range, fuel efficiency, emissions, and power would be optimized, but at other speeds the balance between these factors would vary: for example, an engine designed to have its cams actuate the valves for some preferred fuel efficiency, emissions, and power at high speed might have poor fuel efficiency, emissions, and power at low speed.

This led to the advent of variable valve actuation systems, which would modify the valve profile (the valve position over the engine cycle, i.e., over a 720 degree rotation of the crankshaft) to attain better performance over a wider range of speeds. The simplest variable valve actuation systems simply modify standard cam-based systems to advance or retard the timing of valve openings and closings; more complex systems might independently actuate each valve with solenoids, hydraulic actuators, or the like to allow totally independent control of the timing and lift height of each valve.

However, greater freedom in valve actuation bears greater complexity with engine control strategies. To illustrate, an engine's performance is heavily dependent on the mass air per cylinder (MAC, i.e., the mass of air in the combustion chamber immediately prior to ignition), which is in turn dependent on the valve profile (valve timing and/or lift). Knowledge of the correct MAC is critical for determining the desired amount of fuel to inject or otherwise provide to the combustion chamber (i.e., to get the correct air/fuel ratio), and is also useful for determining spark timing and other engine control parameters. Usually, the MAC is calculated from the "Speed Density" model, wherein the measured air pressure in the intake manifold (Manifold Absolute Pressure or MAP) and temperature are used to calculate a theoretical MAC using ideal gas laws. A volumetric efficiency (VE) correction is then used to compensate for differences between the theoretical and actual MAC (with volumetric efficiency being a measure of the efficiency with which the engine can move the charge into and out of the cylinder, usually expressed as the ratio of the actual flow into the engine as compared to the theoretical flow). Since volumetric efficiency varies with engine speed and load, look-up tables in the Engine Control Unit (ECU, the computer/processor used to control the engine) are usually used to identify the volumetric efficiency at a particular speed and load, and thereby determine the MAC (and thus the injected fuel amount, spark advance, etc.). Since the combustion cycles of different cylinders are usually out of phase (i.e., intake, compression, expansion and exhaust occur at different times in different cylinders), it should be understood that MAC may be calculated at different times during the engine cycle for different cylinders. Thus, in essence, common engine control systems for multi-cylinder engines simply monitor the MAP, have the ECU determine the VE at the current engine speed, and calculate the MAC from the VE and the MAP, with each cylinder undergoing an intake stroke being assumed to receive the same amount of air (i.e., each cylinder having open intake valves is assumed to have the same "average" MAC). Further corrections to the calculated MAC may also be applied, for example, by monitoring exhaust oxygen and adapting the injected fuel to attain the desired air/fuel ratio for the calculated MAC.

However, the speed density model has several drawbacks. Initially, since changes in valve timing and lift also change engine parameters such as volumetric efficiency, it becomes difficult and burdensome to generate look-up tables for all possible valve states. The difficulty and burden is further enhanced when good performance is desired under transient engine conditions (i.e., when the engine is moving between different speeds and loads), since VE may be different under transient conditions than at steady-state operation. The end effect is that the MAC calculated from the MAP is less accurate than it ideally could be, particularly during transient engine conditions, and thus dependent events such as fuel injection amounts and timing, spark timing, etc. are nonideal as well. This in turn results in lost performance, wasted fuel, and/or greater emissions. Additionally, it is often incorrect to assume that the same amount of air is supplied from the manifold to all cylinders which are simultaneously undergoing intake. Different cylinders often have different gas dynamics depending on the manifold and intake runner configuration, engine speed, etc., and while the difference between cylinders is often minor, these minor differences lead to significant performance loss, fuel waste, and excess emissions, since cylinders having a MAC which deviates from the average are effectively being mis-operated.

Other control systems attempt to determine MAC more directly by using a mass air flow (MAF) sensor to determine the air supplied to the cylinders. Usually this arrangement takes the form of an element upstream from the throttle which is heated to a constant temperature, and the current needed to maintain the element at the desired temperature provides a measure of the airflow (which cools the element in accordance with the mass flowing past the element). These systems are also susceptible to error during transient conditions, particularly where sudden changes in throttle position occur. As an example, if the throttle is suddenly opened, a MAF sensor may detect a large surge of air entering the throttle, with the surge arising from air rushing past the throttle and into the manifold (and compressing the air therein). However, the cylinders do not take in all of this air, and thus the MAF sensor's reading leads to an inappropriately large MAC estimate and a correspondingly excessive fuel pulse. Similarly, when the throttle is suddenly closed, the cylinders can draw more air than the MAF sensor measures, leading to an erroneously low MAC estimate (and insufficient fuel injection). Thus, MAF-based injection schemes are also imperfect. Further, MAF-based systems also assume that the quantity of air supplied to each cylinder is equal over an engine cycle—in other words, it is assumed that MAC=MAF*cycle time/number of cylinders. Still other systems measure both MAF and MAP, and use both to determine MAC.

It might be assumed that at least some of the foregoing problems—those regarding the use of average estimated cylinder MACs—might be addressed by measuring MAP and/or MAF to each cylinder individually, as by placing pressure and/or mass flow sensors in individual cylinder intake runners. However, this is generally not practical owing to cost and space constraints, and the periodic behavior of the gas in the runners (as intake valves open and close) makes it very difficult to practically and economically monitor pressure and/or mass flow in an accurate and reliable manner. In contrast, placing MAP sensors in the manifold and/or MAF sensors upstream from the throttle, where the gas flow is more uniform, makes it far easier to monitor pressure and/or mass flow.

It would therefore be beneficial to have an engine control system which address the foregoing problems with prior control systems.

SUMMARY OF THE INVENTION

The invention, which is defined by the claims set forth at the end of this document, is directed to an engine control system which at least partially alleviates the aforementioned problems. A basic understanding of some of the preferred features of the control system can be attained from a review of the following brief summary, with more details being provided elsewhere in this document.

The control system is used in an internal combustion engine wherein each cylinder has at least one intake valve which supplies the cylinder with intake air from an intake system (i.e., from the manifold, runners, etc.), at least one exhaust valve supplying exhaust gas from the cylinder to an exhaust system, and at least one fuel injector which supplies the cylinder with fuel (via port injection, direct injection, or other forms of injection). Most preferably, the control system is implemented in an engine wherein at least one of the valves has a valve lift profile which varies depending on at least one of engine speed and engine load, i.e., in an engine having variable valve lift and/or timing, for which VE lookup techniques are difficult to implement. The control system includes a virtual model (equations, look-up tables, and/or other relations) of the engine which may be implemented in the ECU or in another electronic processor operating alongside the ECU, but wherein the virtual model evaluates the engine's states at least a fraction of an engine cycle in the future (generally 0.1 to 4 cycles in the future). More particularly, the virtual model preferably contains a thermodynamic model accounting for the mass and energy transit into and out of each cylinder. Thus, the mass air flow into each cylinder can be simulated so that an estimate of the cylinder's MAC is known once the (virtual) intake valve closes (which will occur in advance of the actual valve closing). The estimated MAC can then be used to wholly or partially determine the actual fuel injection (e.g., the pulse width of the injected fuel) for the cylinder in question, as well as other engine control parameters such as the spark advance (which may also be dependent on factors such as engine speed, exhaust gas residual, etc.).

Beneficially, the estimated MAC calculated by the virtual cylinder model can be more accurate than the one determined by MAF measurements taken upstream from the throttle: in essence, the MAC is estimated at the cylinder itself, rather than estimated at the throttle. Additionally, since the virtual model can directly account for the gas dynamics of the cylinder, rather than indirectly accounting for the gas dynamics by use of a VE correction or the like, the error associated with the estimated MAC under transient engine operation is minimized. Further, by modeling each cylinder individually, each cylinder's fuel injection and spark can be set in accordance with the cylinder's own estimated MAC, rather than an averaged value shared with other cylinders.

Since the virtual model must execute at least as rapidly as an engine cycle (the rapidity of which varies with engine speed), it must be computationally efficient, and it can be constructed with varying degrees of complexity (and output accuracy) depending on the desired accuracy and available calculation speed. Most preferably, the virtual cylinder evaluates models mass and energy flows through the intake and exhaust system as well as through the cylinder, with one-dimensional compressible gas flow being assumed for sake of computational efficiency.

Since a virtual cylinder model may not perfectly track the behavior of the actual cylinder, particularly if a simpler model is used, actual/measured engine parameters can be used as feedback to the virtual cylinder model to adapt its behavior to better track actual cylinder performance. This can be done, for example, by providing the control system with measurements of the air supplied to all cylinders during each engine cycle (i.e., the actual MAP and/or MAF), comparing these values to the estimated values calculated by the virtual cylinder models, and adapting the virtual cylinder models (or the actual engine) to reduce the error between estimated and actual values. As an example, the virtual cylinder models can be used to calculate an estimated MAF, and if error exists between the actual (measured) MAF and the virtual (estimated) MAF, the virtual cylinder model can be adapted to reduce or eliminate the error—for example, by adapting the virtual cylinder model to increase or decrease the temperature of the air supplied to the virtual cylinder, thereby increasing or decreasing its density, and thus increasing or decreasing the virtual (estimated) MAF. Additionally or alternatively, the virtual cylinder models can be used to calculate an estimated MAP, and if error exists between the actual (measured) MAP and the virtual (estimated) MAP, the throttle area in the virtual cylinder model (or on the actual engine) can be adapted to reduce or eliminate the error.

Since the virtual cylinder models can track the mass flows out of a cylinder as well as into it, they can also be used to determine and control parameters such as residual exhaust gas (the combustion products retained within the cylinder at the end of the exhaust stroke). Since residual exhaust gas can lower combustion temperature (and thereby reduce NOx emissions), it is a useful parameter to control. Thus, for example, a virtual cylinder model can determine the amount of exhaust gas expelled from a (virtual) cylinder, and thereby know the amount retained when the (virtual) exhaust valve(s) close. This residual exhaust gas can then be considered alongside the air accepted by the (virtual) intake valve(s) during the next engine cycle (i.e. alongside the MAC) when determining the amount of fuel to inject. Since it is generally desirable to advance the spark as residual exhaust gas increases, the control system can then use the estimated residual exhaust gas (as well as the estimated MAC) to set the actual spark timing for the actual cylinder. Additionally or alternatively, the timing and lift of the exhaust valve (and possibly the intake valve) can be adapted by the control system to attain some desired amount of residual exhaust gas.

Further advantages, features, and objects of the invention will be apparent from the following detailed description of the invention in conjunction with the associated drawings.

DETAILED DESCRIPTION OF PREFERRED VERSIONS OF THE INVENTION

Figure 1:
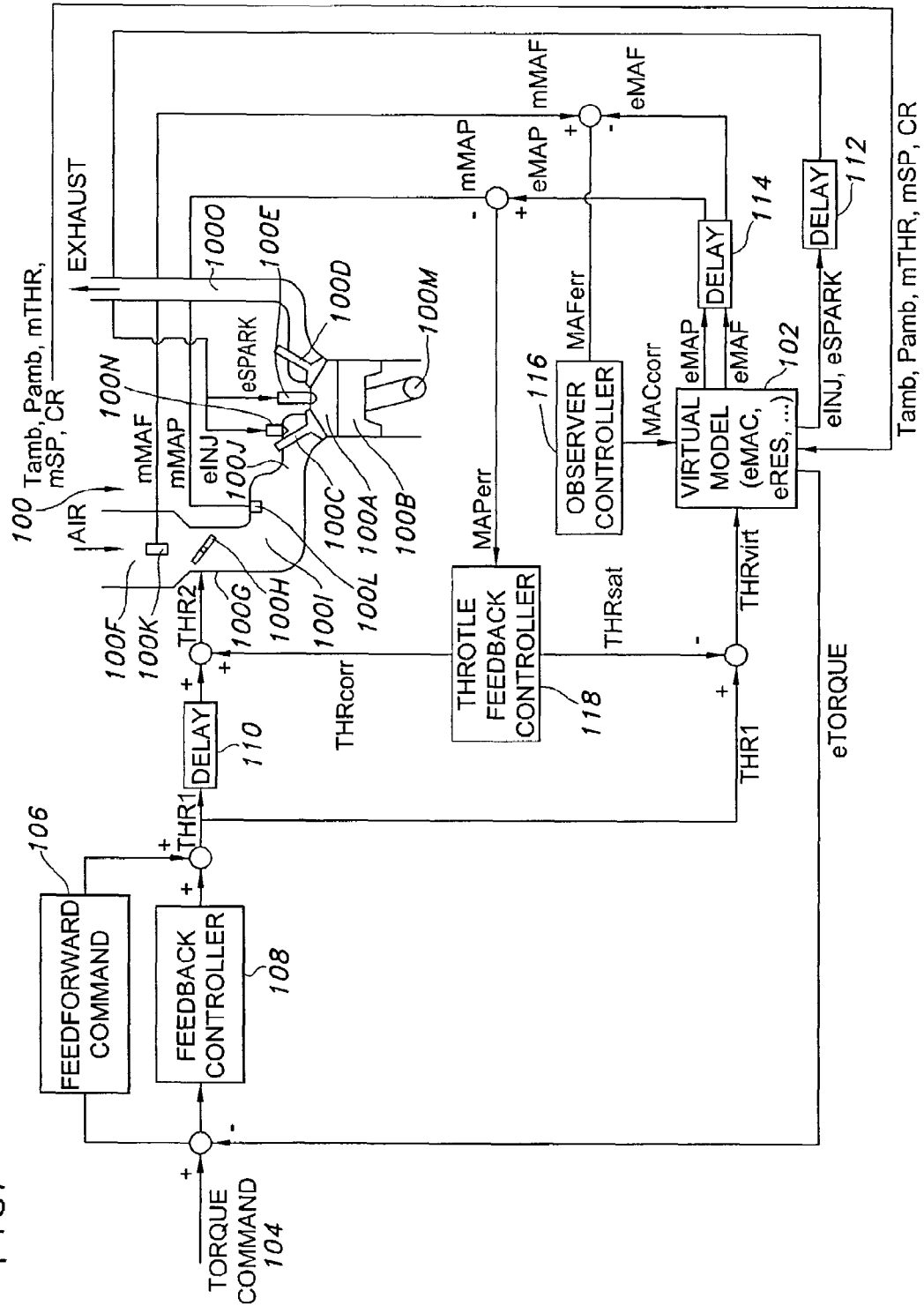
FIG. 1 depicts a cylinder of an internal combustion engine in combination with a simplified block diagram of an exemplary version of the engine control system.

Referring to FIG. 1 for a depiction of an exemplary version of the invention, an internal combustion engine is depicted at 100. The engine 100 includes a cylinder 100A wherein a piston 100B reciprocates, with an intake valve 100C, exhaust valve 100D, and spark plug 100E being located opposite the piston 100B. Air is supplied to the intake valve 100C via an intake system 100F, which includes a throttle body 100G wherein a throttle 100H is located, an intake manifold 100I, and a runner 100J leading from the manifold 100I to the intake valve 100C. A mass air flow sensor (MAF sensor) 100K is located adjacent the throttle 100H, and a manifold absolute pressure sensor (MAP sensor) 100L is located within the intake manifold 100I. Fuel is supplied to the cylinder 100A over a desired portion of an engine cycle (i.e., over a 720 degree rotation of the crankshaft 100M) by a fuel injector 100N, which is here depicted adjacent the intake valve 100C in a port-style injection arrangement. An exhaust system 100O then receives exhaust from the exhaust valve 100D during the exhaust stroke of an engine cycle.

Looking then to the remainder of the block diagram of FIG. 1 for the signals and processes used to control the engine 100, a virtual model of the engine 100 is provided at 102. The virtual model 102 is preferably implemented in the chip, circuit, and/or other components which constitute the engine control unit (ECU) for the engine 100, and it contains a mathematical representation of the thermodynamic, dynamic, and fluid properties of the cylinder 100A, its components, and its contents. Thus, when the engine 100 is in operation, the virtual model 102 can calculate real-time estimates of mass flow into the intake valve 100C of the cylinder 100A, mass flow out of the exhaust valve 100D, energy production within (and torque output from) the cylinder 100A, and/or other engine parameters as well. However, the virtual model 102 preferably does so at least a fraction of an engine cycle (and preferably at least a quarter of a cycle, i.e., one stroke) in advance of the cylinder 100A itself, thereby allowing future engine parameters calculated by the virtual model 102—e.g., estimated MAC, torque output, etc.—to be used to control the engine 100.

As an example, if the virtual cylinder model 102 includes mathematical representations of the actual cylinder 100A, the intake system 100F (including the valve profile of the intake valve 100C, i.e., valve lift and timing), and the exhaust system 100O (including the valve profile of the exhaust valve 100d), as well as equations accounting for the mass, momentum, energy, and/or entropy (or availability) states of the cylinder 100A throughout the engine cycle, it is possible to calculate the MAC, engine torque output, etc. from inputs such as the ambient temperature and pressure Tamb and Pamb (used to determine density and enthalpy of the intake air); measured throttle position mTHR (which introduces a pressure drop in the intake air prior to the cylinder 100A); the measured engine speed mSP (which, in combination with the configuration of the intake valve 100C, its valve profile, and the intake air density and enthalpy, will help define the mass and energy flow into and out of the cylinder 100A); and the crankshaft position CR (which is preferably measured, but which can be calculated from the speed mSP, and which is in any event useful for modeling the combustion chamber). To calculate the estimated MAC eMAC, the virtual model 102 simply integrates the calculated air mass flow through the intake valve 100C over the time between its opening and its closing. Similarly, by performing an energy balance on the cylinder 100A, estimated torque output eTORQUE can be determined from cylinder pressure calculations. However, the foregoing list of potential inputs to, and calculated outputs from, the virtual model 102 is not exclusive. Other factors such as coolant temperature (which affects cylinder heat transfer), fuel type/octane rating (which affect speed of energy release, i.e., autoignition), and/or relative humidity (also affecting energy release), etc. can be incorporated or substituted, with computational speed being a major factor affecting the size and nature of the virtual model 102 and which/how many inputs it will accept.

In an experimental version of the invention, the virtual model 102 utilizes equations modeling conservation of mass and energy in the cylinder 100A. The intake and exhaust systems 100F and 100O are modeled using measured current values of ambient temperature Tamb, ambient pressure Pamb, measured/actual throttle position mTHR, measured engine speed sSP, and measured (or calculated) crankshaft position CR in mass (via the continuity equation) and momentum balances to calculate mass and energy flow into and out of the cylinder 100A. While current input values are used, the engine states are calculated 100 ms in advance of the real engine 100 using forward calculations (i.e., finite difference methods and the like). Depending on the speed of the engine 100, a 100 ms advance amounts to as little as a fraction of an engine cycle to as much as 4-5 engine cycles. For sake of rapid calculation, flow in the intake and exhaust systems 100F and 100O were considered to be isentropic and one-dimensional (i.e., only varying in one spatial dimension, along the axis of the passage in which flow is occurring). The one-dimensional flow was modeled using the method of characteristics described in Benson, R. S. , "The Thermodynamics and Gas Dynamics of internal-Combustion Engines," Vol. 1, Clarendon Press, Oxford, 1982, with nine nodes in the intake system 100F and 15 in the exhaust system 100O. Further details on this exemplary virtual model 102 can be found in the Ph.D. dissertation authored by coinventor J. Lahti, which is on file at the University of Wisconsin-Madison and which is incorporated by reference herein. However, it should be understood that virtual models 102 for use in the invention may take a wide variety of different forms, and may use different input parameters than those noted above, to generate outputs different from those noted above.

Preferably, a user inputs a torque command to the control system at 104, with the command being delivered (for example) by stepping on a vehicle's accelerator pedal. (The use of torque commands, as opposed to traditional throttle commands, is contemplated since torque commands may allow for easier implementation of the control strategy in hybrid gasoline/electric vehicles. However, as will be discussed below, torque commands could be substituted with throttle or other commands, if desired.) The torque command 104 is fed forward and converted to a throttle control signal at feedforward block 106, and is also combined with an estimated torque signal eTORQUE from the virtual model 102. The resulting difference (torque error) is also converted to a throttle correction in feedback controller 108 before being combined with the throttle command from the feedforward converter 106. The resulting throttle control signal THR1 is then delayed at 110 before being summed with a throttle correction signal THRcorr (to be discussed shortly). The delay 110 causes the virtual engine model 102 to run ahead of the actual engine 100 (or, more accurately, it causes the commands to the actual engine 100 to lag those supplied to the virtual model 102). Note that the delay 110 will synchronize THR1 with THRcorr, since THRcorr is itself generated with the use of delayed signals. The resulting corrected throttle signal THR2 is then supplied to the throttle 100H.

The virtual model 102, which (as noted previously) monitors the position of the throttle 100H and other parameters which allow calculation of estimated future states of the engine 100, calculates an estimated MAC eMAC as described above. The estimated MAC eMAC allows the virtual model 102 to look up or otherwise determine an appropriate air/fuel ratio (with the air/fuel ratio possibly being partially dependent on other factors as well as eMAC, e.g., on measured engine speed mSP, engine coolant temperature, etc.), which in turn defines an estimated pulse width for the fuel injector 100N. The resulting fuel injection signal, labeled eINJ, is then supplied to the fuel injector 100N after applying a delay 112. The delay 112 must be of sufficient duration to synchronize the fuel injection signal eINJ—which was calculated on the basis of future engine states within the virtual model 102—to the appropriate time to begin the fuel pulse (generally at some time prior to the intake stroke). If desired, the virtual model 102 can also calculate other desired engine control parameters, such as the spark advance, denoted by eSPARK, which may be supplied to the spark plug 100E after also applying the delay 112.

Thus, the fuel injection signal eINJ and spark signal eSPARK, which are determined in the virtual model 102 at least partially on the basis of the estimated MAC eMAC calculated to occur when the intake valve 100C later closes, are delayed from the future to an appropriate present time for delivery to the engine 100. While the injection signal eINJ is determined from the MAC predicted when the intake valve 100C later closes, fuel injection can nevertheless begin while the intake valve 100C is still open,. Similarly, the spark signal eSPARK can be delivered to the spark plug 100E at an appropriate time during the compression stroke of the engine 100, even though it may be calculated during the intake stroke or beforehand (and possibly as long as several engine cycles beforehand). It should thus be understood that while the fuel injection signal eINJ and the spark signal eSPARK are depicted on the same signal line in FIG. 1, with the same delay 112, this is merely for the sake of simplicity, and they will generally be provided as separate signals with potentially different delays.

The injection signal eINJ and/or the spark signal eSPARK may also be at least partially dependent on other estimated engine parameters calculated by the virtual model 102, such as the estimated (absolute or fractional) residual exhaust gas eRES retained in the cylinder 100A after the exhaust valve 100D closes. This can be calculated by integrating the mass flow out of the (virtual model of the) exhaust valve 100D over time, similarly to the estimated MAC eMAC, and then subtracting this outflow from the mass of the overall combustion products (which should be equal to the mass of the estimated MAC eMAC, plus the mass of the injected fuel, plus the mass of any residual exhaust gas from the prior engine cycle). The injection signal eINJ and/or the spark signal eSPARK can then be compensated for the effect of the estimated residual exhaust gas eRES within the cylinder during the subsequent intake, compression and power strokes.

The virtual model 102 can also calculate estimated future engine parameters such as an estimated MAP eMAP, and/or an estimated MAF eMAF, and compare these to measured values (after applying a delay 114 to synchronize them with the present state of the engine 100). If error exists, this can be used as feedback to adjust the virtual model 102 and/or the engine 100 to reduce steady-state error between the two. In the exemplary control arrangement of FIG. 1, the following corrections are applied.

First, a mass air flow error signal MAFerr is calculated from the measured MAF MMAF from the MAF sensor 100K, and from the estimated MAF eMAF from the virtual model 102. The MAF error signal MAFerr can be supplied to an observer controller 116 to generate a correction signal MACcorr whereby the estimated MAC eMAC can be compensated for errors in the estimated air flow into the cylinder 100A. The correction signal MACcorr can take a variety of forms, with perhaps the easiest approach being to simply adapt one of the parameters used to calculate the estimated MAC eMAC. As an example, MACcorr could constitute an adjustment to the measured ambient temperature Tamb, thereby adapting the air density (and thus the eMAC) calculated by the virtual model 102. To illustrate, if the estimated MAF eMAF is too low in comparison to the measured MAF MMAF, the measured ambient temperature signal Tamb supplied to the virtual model 102 can be decreased to increase the calculated air density, and thus the calculated eMAC and eMAF.

Second, the estimated MAP eMAP from the virtual model 102 and the measured MAP mMAP from the MAP sensor 100L may be used to generate a pressure error MAPerr which can be used for multiple purposes. Initially, a throttle correction signal THRcorr can be generated in a throttle feedback controller 118 for application to the throttle command THR1, resulting in modified throttle command THR2 to the throttle 100H, thereby adapting the area of the throttle 100H to move the measured MAP mMAP toward correspondence with the estimated MAP eMAP. Thus, MAPerr is used to apply a throttle area correction to the real engine 100, rather than to the virtual model 102 or associated components of the control system. However, if the throttle 100H is fully opened (or fully closed), the throttle is saturated: adjustments to the throttle command signal THR1 cannot effect further opening (or closing). In this case, a secondary throttle correction signal THRsat from the throttle feedback controller 118 can be applied to the throttle command THR1 to generate a corrected throttle signal THRvirt for supply to the virtual model 102. The primary purpose of THRsat is to ensure that the virtual model 102, which would otherwise receive the uncorrected throttle command signal THR1, does not begin to operate in an unrealistic range when the throttle 100H becomes saturated. For example, once the throttle 100H is fully opened, the throttle command THR1 cannot effect further opening, and thus THRsat adapts THR1 (as THRvirt) to maintain THRvirt within a realistic range before receipt by the virtual model 102. Since THRvirt better models the actual area of the throttle 100H, eMAP should better match mMAP, thereby reducing MAPerr (and in turn THRsat). In short, MAPerr will drive the real throttle 100H toward the virtual throttle within the virtual model 102, and/or will drive the virtual throttle of the virtual model 102 toward the real throttle 100H, in an effort to bring mMAP and MAPerr into correspondence.

It is not necessary that both (or in fact either) of the measured MAF MMAF and measured MAP mMAP be used to reduce steady state errors. If either of the MAF sensor 100K and/or MAP sensor 100L were to fail (as indicated by an onboard diagnostic test), the MAFerr/MAPerr feedback correction could be disabled. In this case, the virtual model 102 would still continue to provide reasonably good estimates of engine states/parameters, and the vehicle can still be driven. Thus, unlike some present control schemes which are critically dependent on measured MAF and/or measured MAP readings, the present control strategy only requires that the virtual model 102 be able to output estimated future engine states upon which control commands can be based. If MAF and/or MAP are measured, these can be used to make corrections to the virtual model 102 for modeling errors, and/or to make corrections to the throttle 100H for hardware variation, but they are no longer the foundational measurements upon which the engine control scheme is based.

The foregoing description relates to an exemplary version of the invention, and it should be understood that various modifications are considered to be within the scope of the invention. Following is an exemplary list of such modifications.

First, it should be understood that the engine 100 is depicted in simplified form, and it must be kept in mind that the arrangement of the engine 100 is merely exemplary, and numerous structural variations to the engine 100 are possible, e.g., the cylinder 100A could include one or more intake valves 100C and/or exhaust valves 100D, the fuel injector 100N could be provided in a direct injection system wherein the fuel injector 100N injects fuel directly into the cylinder 100A, etc. The engine 100 may (and often will) include additional components not shown in FIG. 1, such as multiple cylinders 100A, the sensors needed for the measurement of various previously-discussed signals (e.g., the position/phase of the crankshaft 100M, measurement of ambient temperature Tamb, measurement of ambient pressure Pamb, etc.), and other components useful for executing the foregoing control strategies. Other sensors for supplying additional or different control parameters could also be used, e.g., exhaust gas oxygen sensors in the exhaust system 100O (which might provide feedback for further adaptation of fuel injection pulse width), etc.

Second, the control system need not use torque commands, and could simply use throttle commands (as in conventional in standard gasoline-powered vehicles). Other command signals could also or alternatively be used (e.g., the lift and timing of the valves 100C and 100D could be controlled in place of the throttle 100H), and the command inputs are not regarded as being a critical aspect of the invention.

Third, other engine operating commands apart from fuel injection and spark (eINJ, eSPARK)—for example, valve lift and/or timing—can be generated from the virtual model 102 to attain desired fuel economy, emissions, and/or other operational goals. As an example, high levels of residual exhaust gas cause poor combustion quality, which can cause a rough idle or poor driveability. Thus, if calculated residual exhaust gas eRES grows too high, the valve timing and/or lift could be adapted to reduce the residual exhaust gas to an acceptable level. Alternatively, if the engine is being operated in ranges that produce high NOx emissions or the like, the valve timing and/or lift could be adapted to increase the residual exhaust gas, thereby decreasing peak combustion temperature and producing an overall reduction in the high-temperature conditions under which NOx emissions increase.

In similar respects, the control system could be used to anticipate and reduce conditions such as autoignition (knock). If the control system can identify and store the temperatures, pressures, and speeds at which knock occurs, it can later intelligently adjust the spark advance to prevent autoignition. Since the virtual model 102 runs ahead of the actual engine 100, spark advance correction can be applied before knock occurs in the real engine 100.

Fourth, in the exemplary control system discussed above, steady state error is reduced by use of feedback from the MAF sensor 100K and MAP sensor 100L, but these are merely used because these are commonly used sensors on current production vehicles. Other sensors/parameters could be used in place of, or in addition to, these sensors/parameters. As an example, a pressure transducer provided in the cylinder 100A would also provide useful feedback information to the virtual model 102 to allow reduction or elimination of error between estimated future engine states (which would be used for control commands), and the actual/measured engine states.

Fifth, while the virtual model 102 described above uses a simplified thermodynamic engine model (with one-dimensional fluid flow, etc.), the model can increase in detail to provide better performance as faster and more economical processors become available. As examples, the model could be enhanced to include three dimensional wave analysis, multi-zone combustion, multi-zone heat transfer, combustion knock (autoignition), chemical reaction modeling, reaction rate and/or combustion variability compensation, and emissions analysis.

Sixth, while each cylinder 100A of the engine 100 is preferably provided with its own virtual model 102, with each cylinder 100A therefore being independently controlled, it is possible to have a virtual model 102 model and control more than one cylinder. A simple example of such an arrangement is where two or more cylinders have relatively identical configurations and synchronized strokes (i.e., each of the intake/compression/power/exhaust strokes occur at the same times in different cylinders). In this case, a single virtual model 102 might model more than one cylinder 100A.

The invention is not intended to be limited to the preferred versions described above, but rather is intended to be limited only by the claims set out below. Thus, the invention encompasses all different versions that fall literally or equivalently within the scope of these claims.

What is claimed is:

1. A control system for a multi-cylinder internal combustion engine, wherein for each cylinder:
   a. the control system calculates estimates of:
      (1) the mass inputs entering the cylinder, the mass inputs including intake air,
      (2) the mass within the cylinder, and
      (3) the mass outputs exiting the cylinder, the mass outputs including exhaust gas,
      at least a fraction of an engine cycle in the future; and
   b. the control system supplies fuel to the cylinder in accordance with the estimated mass within the cylinder.

2. The control system of claim 1 wherein the control system also supplies an igniting spark to each cylinder, wherein the timing of the spark for each cylinder is independent of the timing of the spark for at least some of the other cylinders.

3. The control system of claim 2 wherein the timing of the spark supplied to each cylinder is dependent on the estimated mass within the cylinder.

4. The control system of claim 1 wherein during each engine cycle:
   a. the control system receives a measurement of the air actually supplied to all cylinders collectively;
   b. the control system calculates an estimate of the air supplied to all cylinders collectively; and
   c. the control system adapts its calculations to reduce the difference between the estimate of the air supplied to all cylinders and the measurement of the air actually supplied to all cylinders collectively.

5. The control system of claim 1 wherein:
   a. the calculated estimates of the mass entering, exiting, and within each cylinder are calculated within a virtual engine model which simulates the operation of the engine at least a fraction of an engine cycle in the future, and
   b. the virtual engine model also calculates estimates of the energy entering, exiting, and within each cylinder.

6. The control system of claim 5 wherein the virtual engine model calculates the estimated mass within each cylinder between 0.1 and 4 cycles in advance of the engine's present cycle.

7. The control system of claim 5 wherein the virtual engine model models the intake air as being:
   a. compressible, and
   b. variable in only one dimension.

8. The control system of claim 1 wherein the estimate of the mass within the cylinder includes an estimate of the residual exhaust gas retained within each cylinder from any prior engine cycles.

9. The control system of claim 8 wherein the control system also supplies an igniting spark to each cylinder, the timing of the spark for each cylinder is dependent on the cylinder's estimated residual exhaust gas.

10. The control system of claim 8 wherein:
    a. each cylinder includes at least one intake valve and at least one exhaust valve; and
    b. the control system alters the actuation of at least one of the intake and exhaust valves for each cylinder in dependence on the cylinder's estimated residual exhaust gas.

11. The control system of claim 1 wherein each cylinder includes at least one intake valve and at least one exhaust valve, at least one of these valves having a valve lift profile which varies depending on at least one of:
    a. engine speed, and
    b. engine load.

12. A control system for a multi-cylinder internal combustion engine wherein each cylinder includes:
    (1) at least one intake valve supplying the cylinder with air from an intake system during an engine cycle;
    (2) at least one fuel injector supplying the cylinder with fuel during the engine cycle; and
    (3) at least one exhaust valve supplying exhaust gas from the cylinder to an exhaust system during the engine cycle,
    wherein the control system includes, for each cylinder, a virtual engine model which:
    a. calculates, during each engine cycle, an estimation of the contents of the cylinder at least a fraction of an engine cycle in the future; and
    b. actuates the fuel injector in accordance with the estimated cylinder contents.

13. The control system of claim 12 wherein the virtual engine model calculates the estimated air charge for each cylinder between 0.1 and 4 cycles in advance of the engine's present cycle.

14. The control system of claim 12 wherein the estimated air charge calculations performed by the virtual engine model assume that air flow from the intake system to each cylinder:
    a. is compressible, and
    b. is only variable in one dimension.

15. The control system of claim 12 wherein each cylinder's virtual engine model also calculates, during each engine cycle, an estimation of the exhaust gas exiting the cylinder when the cylinder's exhaust valve is open.

16. The control system of claim 15 wherein each cylinder's virtual engine model also calculates, during each engine cycle, an estimation of the exhaust gas exiting the cylinder at least a fraction of an engine cycle in the future.

17. The control system of claim 16 wherein the calculation of the estimated contents of the cylinder includes a calculation of the estimated residual exhaust gas retained within each cylinder after the cylinder's exhaust valve is closed.

18. The control system of claim 17 wherein the control system also controls the supply of an igniting spark to each cylinder, the timing of each cylinder's spark being dependent on:
    a. the cylinder's estimated air charge, and
    b. the cylinder's estimated residual exhaust gas.

19. The control system of claim 17 wherein the control system alters the actuation of at least one of the intake and exhaust valves for each cylinder in dependence on the cylinder's estimated residual exhaust gas.

20. The control system of claim 12 wherein:
    a. the virtual engine model receives measurements of the air being supplied to the engine during the engine cycle;
    b. the virtual engine model also calculates an estimate of the air being supplied to all cylinders during the engine cycle; and
    c. the virtual engine model is at least periodically modified to reduce the difference between the estimated air being supplied to all cylinders and the measured air being supplied to the engine.

21. The control system of claim 12 wherein the control system also controls the supply of an igniting spark to each cylinder, the timing of each cylinder's spark being dependent on that cylinder's estimated air charge.

22. The control system of claim 12 wherein the engine has a valve lift profile which varies depending on at least one of:
    a. engine speed, and
    b. engine load.

23. The control system of claim 12 wherein:
    a. the engine includes an adjustable throttle which meters the air supplied to the intake system;
    b. the measurement of the air supplied to the cylinders includes a measured intake system pressure;
    c. the control system also calculates an estimated intake system pressure for the cylinders; and
    d. the throttle is at least periodically adjusted to reduce the difference between the estimated intake system pressure and the measured intake system pressure.

24. A control system for a multi-cylinder internal combustion engine wherein each cylinder includes:

(1) at least one intake valve supplying the cylinder with air from an intake system during an engine cycle, and
(2) at least one exhaust valve supplying exhaust gas from the cylinder to an exhaust system during the engine cycle, wherein the control system:

a. receives measurements of the air supplied to the cylinders during the engine cycle;

b. calculates for each cylinder, in advance of the closing of the cylinder's intake valve, an estimated air charge that will be contained in the cylinder upon such closing; and c controls the supply of fuel to each cylinder in accordance with that cylinder's estimated air charge.

* * * * *